US009933518B2

(12) United States Patent
Schoor

(10) Patent No.: US 9,933,518 B2
(45) Date of Patent: Apr. 3, 2018

(54) FMCW RADAR HAVING DISTANCE RANGE GRADUATION

(71) Applicant: Robert Bosch GmbH, Stuttgart (DE)

(72) Inventor: Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 434 days.

(21) Appl. No.: 14/762,292

(22) PCT Filed: Dec. 3, 2013

(86) PCT No.: PCT/EP2013/075357
§ 371 (c)(1),
(2) Date: Jul. 21, 2015

(87) PCT Pub. No.: WO2014/114391
PCT Pub. Date: Jul. 31, 2014

(65) Prior Publication Data
US 2015/0378016 A1    Dec. 31, 2015

(30) Foreign Application Priority Data

Jan. 22, 2013    (DE) .................. 10 2013 200 951

(51) Int. Cl.
G01S 13/34    (2006.01)
G01S 13/58    (2006.01)
G01S 13/93    (2006.01)

(52) U.S. Cl.
CPC .......... G01S 13/584 (2013.01); G01S 13/345 (2013.01); G01S 13/931 (2013.01)

(58) Field of Classification Search
CPC ..... G01S 13/345; G01S 13/584; G01S 13/931
(Continued)

(56) References Cited

U.S. PATENT DOCUMENTS 8,704,704 B2    4/2014 Luebbert et al.
2010/0289692 A1    11/2010 Winkler
(Continued)

FOREIGN PATENT DOCUMENTS

CN    1973212 A    5/2007
DE    102 43 811    4/2004
(Continued)

*Primary Examiner* — Timothy A Brainard
(74) *Attorney, Agent, or Firm* — Norton Rose Fulbright US LLP; Gerard Messina

(57) ABSTRACT

An FMCW radar sensor and method for determining information about distances and relative velocities of objects using an FMCW radar, in which a transmission signal's frequency is modulated as sequences of frequency ramps, the center points of the frequency ramps within a respective sequence lying on a higher-order ramp; a higher-order frequency spectrum being determined for at least one frequency position in frequency spectra of the baseband partial signals over the chronological sequence of amplitudes at the frequency position in the frequency spectra of the sequence of baseband partial signals; peaks in the at least one higher-order spectrum being represented by straight lines in a distance/velocity space, the respective slope of which is a function of the higher-order ramp's slope; and bands of the distance/velocity space of the respective peaks of the frequency positions in the frequency spectra of the baseband partial signals being considered in the frequency matching.

10 Claims, 3 Drawing Sheets

(58) Field of Classification Search
USPC .......................................................... 342/21
See application file for complete search history.

(56) References Cited

U.S. PATENT DOCUMENTS

2011/0309968 A1* 12/2011 Reiher .................... G01S 7/354
                                                        342/70
2012/0235854 A1*  9/2012 Testar ....................... G01S 7/35
                                                        342/109

FOREIGN PATENT DOCUMENTS

| DE | 10 2009 000468 | 8/2009 |
|----|----|----|
| EP | 1 918 736 | 5/2008 |
| JP | H1130663 A | 2/1999 |
| JP | H11287854 A | 10/1999 |
| JP | 2001166044 A | 6/2001 |
| JP | 3726441 B2 | 12/2005 |
| JP | 2008514936 A | 5/2008 |
| JP | 2008533495 A | 8/2008 |
| JP | 2009216680 A | 9/2009 |
| JP | 2009541719 A | 11/2009 |
| JP | 2012518795 A | 8/2012 |
| JP | 2012522999 A | 9/2012 |

\* cited by examiner

FMCW RADAR HAVING DISTANCE RANGE GRADUATION

FIELD OF THE INVENTION

The present invention relates to a method for determining information about distances and relative velocities of located objects using an FMCW radar, in which the frequency of a transmission signal is modulated in the form of frequency ramps and the signals received in the frequency ramps are down-mixed to baseband signals. The present invention also relates to an FMCW radar sensor, in which this method is implemented, and which, for example, may be used in driver assistance systems for motor vehicles.

BACKGROUND INFORMATION

The basic principle of the function of an FMCW radar sensor (frequency modulated continuous wave) is that the frequency of a transmitted radar signal is modulated in the form of a ramp and the signal reflected by an object and received again by the sensor is mixed with a part of the signal transmitted at the moment of reception to form a baseband signal. The baseband signal then contains a frequency component which corresponds to the difference frequency between the transmitted signal and the received signal. On the one hand, the frequency is a function of the object distance due to the change in transmitting frequency arising during the signal propagation delay, but on the other hand is also a function of the relative velocity of the object due to the Doppler Effect.

The baseband signal is normally segmented by rapid Fourier transformation into its frequency spectrum, and each located object is represented in this spectrum by a peak at a frequency, which is a function of the distance and the relative velocity of the object. In this case, the frequency of a received peak establishes a relationship between the relative velocity and the distance in the form of a linear correlation, corresponding to a straight line in a distance/velocity space. The term "linear" in this case is understood to mean that the correlation identified by it may include a linearity factor and an additive term.

Thus, based on one single frequency obtained, it is not yet possible to clearly determine the actual distance and the actual velocity of an object. For that, it is necessary instead to locate the same object on at least two frequency modulation ramps of the transmitted signal, whereby these two frequency modulation ramps must have different slopes.

The frequencies of the baseband signal obtained in the individual frequency modulation ramps are then associated with objects based on coincidences between the possible values of distance and relative velocity associated with both frequencies. In the case of two straight lines in the distance/velocity space, this corresponds to a point of intersection of the two straight lines. This association of the frequencies or straight lines to potential objects is referred to as matching or frequency matching. With such a comparison of the different linear relationships obtained in the case of the individual frequency modulation ramps, it is possible to calculate relative velocity and distance of a radar object. The FMCW method is particularly efficient when only a few radar objects are detected.

If, however, multiple objects are situated simultaneously in the locating range of the radar sensor, the problem then arises that it may no longer be clearly determined which peak belongs to which object, even when evaluating two modulation ramps. Thus, for example, for a situation involving two objects in the distance/velocity space, also referred to hereinafter as d-v-space, two pairs of parallel straight lines are obtained, which between them form four points of intersection. However, only two of these points of intersection may correspond to real objects, whereas the other points of intersection represent so-called pseudo objects.

Therefore, more than two modulation ramps of differing slope are normally used, for example, four modulation ramps. Real objects may then be detected by the fact that in the d-v-space a coincidence exists between distance/velocity pairs belonging to the frequencies of the baseband signal obtained on the four different frequency ramps.

However, since the frequencies of the peaks may be determined with limited accuracy only, it cannot also be expected for a real object that the four straight lines belonging to the four modulation ramps intersect at exactly one point. Rather, up to six different points of intersection will be obtained, which, however, lie relatively close to one another. When comparing the different linear relationships, as part of the search for a coincidence, a certain tolerance is therefore allowed. The criterion for a real object may, for example, be that all straight lines obtained from the different modulation ramps intersect in one point within the scope of the tolerance limits.

However, in situations involving a plurality of radar targets, such as objects in the form of guardrail posts, or a plurality of motor vehicles in the locating range, for example, motor vehicles at the end of a traffic jam or in parking lots, the effort required to detect the objects is increased. Thus, as the number of objects and number of modulation ramps increases, so too does the computational effort.

SUMMARY OF THE INVENTION

The object of the present invention is to provide a method for determining information about distances and relative velocities of located objects, which has an improved detection performance and/or requires a reduced computational effort.

This object is achieved according to the present invention by a method for determining information about distances and relative velocities of located objects using an FMCW radar, in which:
the frequency of a transmission signal is modulated in the form of frequency ramps, the center points of the frequency ramps within a particular sequence being located on a higher-order ramp;
the signals received in the frequency ramps of a sequence are down-mixed to baseband partial signals, one partial signal being chronologically associated with each frequency ramp of the sequence;
for at least one frequency position in frequency spectra of the baseband partial signals, a higher-order frequency spectrum is determined over the chronological sequence of amplitudes at the frequency position in the frequency spectra of the sequence of the baseband partial signals;
peaks in the at least one higher-order spectrum are represented by straight lines in a distance/velocity space, the respective slope of which is a function of the slope of the higher-order ramp;
different frequency positions in the frequency spectra of the partial signals, in which peaks in a higher-order spectrum occur, are represented by different bands of the distance/velocity space limited to at least one distance range; and to associate peaks in the higher-order spectra represented by straight lines in the distance/velocity space with objects, the respective bands of the distance/velocity space representing the frequency positions in the frequency spectra of the baseband partial signals, which are associated with the respective peaks by the frequency positions of the peaks in the frequency spectra of the baseband partial signals, are taken into account.

Thus, the frequency matching, i.e., the association of peaks represented by straight lines in the distance/velocity space in the higher-order spectra to objects may be carried out based on the straight lines in the distance/velocity space representing the peaks in the at least one high-order spectrum, and based on the respective bands of the distance/velocity space representing the frequency positions in the frequency spectra of the baseband partial signals, which are associated with the peaks by the frequency positions of the peaks in the frequency spectra of the baseband partial signals. The frequency matching takes place based, in particular, on the association of bands of the distance/velocity space with the peaks in the higher-order spectra.

The higher-order ramps may, for example, be conceived of as corresponding to conventional modulation ramps, which, however, are replicated by a sequence of short frequency ramps. It is advantageous that no large frequency jumps are required for the successive short ramps of a sequence. This keeps the demands on frequency generation low.

In a spectral analysis of the baseband signals, for example, a two-dimensional Fourier transformation is carried out. A first dimension in this transformation corresponds to the determination of the frequency spectra of the respective baseband partial signals associated with the individual short frequency ramps. The frequency spectra are composed, for example, of complex amplitudes at respective frequency positions. A second dimension of the Fourier transformation corresponds in this case to the curve over time over the higher-order ramps, each ramp being associated with a point in time. A peak in the two-dimensional frequency spectrum characterizes a frequency position in the frequency spectra of the baseband partial signals associated with the short ramps, as well as a frequency in the shape of a curve over time of values of these frequency spectra over the higher-order ramps at the relevant frequency position in the partial signal frequency spectra. In other words, the peak in the case of a frequency in the higher-order frequency spectrum lies at a frequency position in the partial signal frequency spectra.

The higher-order spectrum may be determined taking into account the associated phases of the amplitudes in the frequency spectra of the sequence of baseband partial signals. This may occur, for example, in that in the step of determining a higher order frequency spectrum for at least one frequency position in frequency spectra of the baseband partial signals, a higher-order frequency spectrum is determined over the chronological sequence of complex amplitudes at the frequency position in the frequency spectra of the sequence of the baseband partial signals. The complex amplitudes may be represented, for example, by absolute value and phase. Such a correct-phase formation of the respective higher-order spectrum is advantageous for precisely detecting peaks in the higher-order spectrum.

The frequencies occurring in a higher-order spectrum are represented in each case by a straight line in the d-v-space, the slope of which is a function of the slope of the higher-order ramp. In a conventional FMCW modulation ramp, this corresponds to the straight lines in the d-v-space characterized by the peak frequency.

According to the present invention, different frequency positions in the frequency spectra of the baseband partial signals are represented by different bands of the d-v-space, each of which is limited to a distance range. One band represents a subarea of the d-v-space. For example, the partial signals are scanned at a few scanning points in the individual frequency ramps. This results in a rough subdivision of the d-v-space into bands, which are not yet sufficient for determining a clear relationship between distance and relative velocity. Each of the bands is limited to a distance range. In particular, each of the bands includes for a respective velocity value a distance range, which corresponds to a distance width of the band. For example, the distance width of each band may be at least 10 m, which may be at least 20 m, for example, at least 30 m.

A peak in the two-dimensional frequency spectrum is thus associated, on the one hand, with a straight line in the d-v-space by the frequency in the higher-order spectrum over the sequence of frequency ramps and, on the other hand, with a band of the d-v-space by the frequency position in the partial signal frequency spectra of the short frequency ramps. By taking this association of bands in the d-v-space with the respective straight lines in the d-v-space during frequency matching into account according to the present invention, it is possible to reduce the complexity of the matching. For example, a search for coincidences for the respective bands of the d-v-space may be carried out separately. Thus, for a band of the d-v-space to be examined, for example, the search for coincidences may be limited to the straight lines or frequencies, in which the peak has the corresponding frequency position in the frequency spectra of the baseband signals.

By taking the bands into account, it is possible to better evaluate superimpositions of radar objects in the frequency range with other stationary radar targets. It is also advantageous that an improved determination of the azimuth angles of located objects may be expected as a result of an improved detection of distances and relative velocities of objects in the case of a radar sensor having multiple antenna lobes, in particular, a multi-channel FMCW radar. Moreover, it is advantageous that the computational effort for distance range graduation by the first dimension of the Fourier transformation is acceptable, due to the small required number of scanning points or frequency bins, whereas the computational effort for the frequency matching may be reduced and/or the detection performance and detection reliability in situations involving various radar targets may be significantly improved.

Additional advantageous embodiments of the present invention are specified in the further descriptions herein.

Exemplary embodiments of the present invention are explained in greater detail in the description below with reference to the drawings.

DETAILED DESCRIPTION

Figure 1:
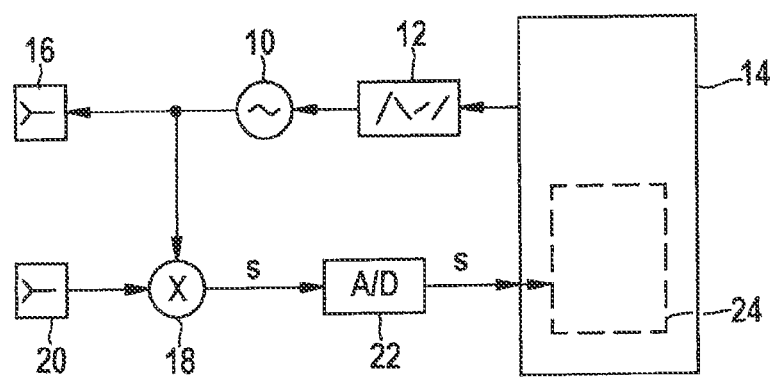
FIG. 1 schematically shows a block diagram of a radar sensor system for motor vehicles.

FIG. 1 schematically shows the structure of a radar sensor system for motor vehicles. The system includes a voltage-controlled high frequency (HF) oscillator 10 for generating a transmission signal. Frequency f of HF oscillator 10 is controlled by a frequency modulation device 12 which, in turn, is controlled by a control and evaluation unit 14. One output of the HF oscillator is connected to at least one transmitting antenna element 16, in order to emit a transmission signal of the radar sensor system.

Another output of HF oscillator 10 is connected to a mixer 18. This mixer is configured to mix a received signal received by a receiving antenna element 20 with the transmission signal, in order to generate a baseband signal. The baseband signal is digitized by an analog-digital converter 22 and fed to control and evaluation unit 14. The mixing and digitizing take place while maintaining the phase relationships between the transmission signal and the received signal. Control and evaluation unit 14 includes a digital signal processing unit 24 for evaluating frequency spectra of the baseband signal and for carrying out a matching for associating the obtained peaks with potential objects or radar targets.

Frequency modulation device 12 is configured to modulate in one measuring cycle of the radar sensor system the transmission signal with ramp sets, each of which includes a sequence of frequency modulation ramps.

Figure 2:
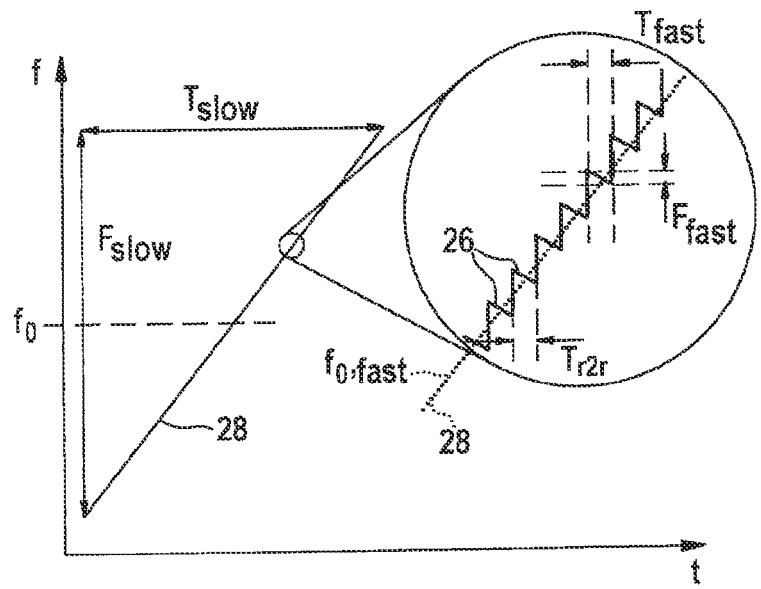
FIG. 2 shows a schematic depiction of a sequence of frequency modulation ramps of a transmission signal forming a higher-order ramp.

FIG. 2 schematically shows, as an example, the curve of frequency f of a transmission signal over time t for one ramp set.

FIG. 2 shows a small time segment of a sequence of identical short frequency ramps 26 in an enlarged detail. The center points of short frequency ramps 26, corresponding to the respective middle frequencies of short frequency ramps 26 passed through at a chronological center point of a respective frequency ramp 26, lie on a higher-order ramp 28. This ramp is depicted in an enlarged detail by dots and as a solid line in the depiction of the overall higher-order ramp 28. Thus, the sequence of short frequency ramps 26 forms a higher-order frequency ramp 28. Higher-order ramp 28 is composed of short ramps 26.

Each of short ramps 26 of a higher-order ramp 28 has the same slope, which corresponds to the quotient of the frequency deviation $F_{fast}$ over time period $T_{fast}$ of a short, rapid ramp 26. Short ramps 26 of a higher-order ramp 28 also have an identical frequency deviation $F_{fast}$ and, accordingly, also an identical ramp duration $T_{fast}$. In addition, short ramps 26 of higher-order ramp 28 each have the same ramp repeat time $T_{r2r}$, which corresponds to the time interval between two ramps 26. In the example shown, ramp interval $T_{r2r}$ is equal to ramp duration $T_{fast}$.

Higher-order ramp 28 has a ramp slope corresponding to the quotient of frequency deviation $F_{slow}$ and ramp duration $T_{slow}$ of ramp 28. The middle frequency of higher-order ramp 26 is identified by $f_0$.

The middle frequency of the transmission signal is on the order of 76 GHz, and frequency deviation $F_{slow}$, by which the frequency changes during the course of each higher-order ramp 28, is on the order of several 100 MHz. The frequency deviation of the short ramps is on the order of several MHz, and the ramp duration of the short ramps is on the order of several microseconds. The lateral interval $T_{r2r}$, in which short ramps 26 follow one another, is on the order of several microseconds. Frequency $F_{slow}$ of higher-order ramp 28 is on the order of several 100 MHz, and ramp slope $F_{slow}/T_{slow}$ of higher-order ramp 28 is on the order of 100 MHz/ms.

The ramp deviation and ramp slope of higher-order ramp 28 correspond, for example, to a conventional frequency ramp of a modulation cycle of an FMCW radar sensor made up of multiple frequency ramps, which carries out a frequency matching for associating located frequencies with detected objects.

The frequency of the baseband signal corresponds to the frequency difference between the transmission signal and the signal, which was received by the receiving antenna element 20 after reflecting off objects, and which also arrives at mixer 18. This frequency difference is cumulatively composed of a distance-dependent portion $f_d$ and a velocity-dependent portion $f_v$.

The distance-dependent portion $f_d$ of the frequency within a short ramp 26 results from the frequency modulation with short ramp 26 and is indicated herein by:

$$f_d = 2dF_{fast}/(cT_{fast}) \quad (1)$$

c being the speed of light and d being the object distance. The velocity-dependent portion results from the Doppler effect and is indicated within a short ramp 26 approximately by $$f_v = 2f_{0,fast}v/c \quad (2)$$

$f_{0,fast}$ being the middle frequency of the respective short ramp 26 changing over the sequence of short ramps 26. It changes over the sequence of ramps 26 corresponding to the linear curve of higher-order ramp 28.

Figure 3:
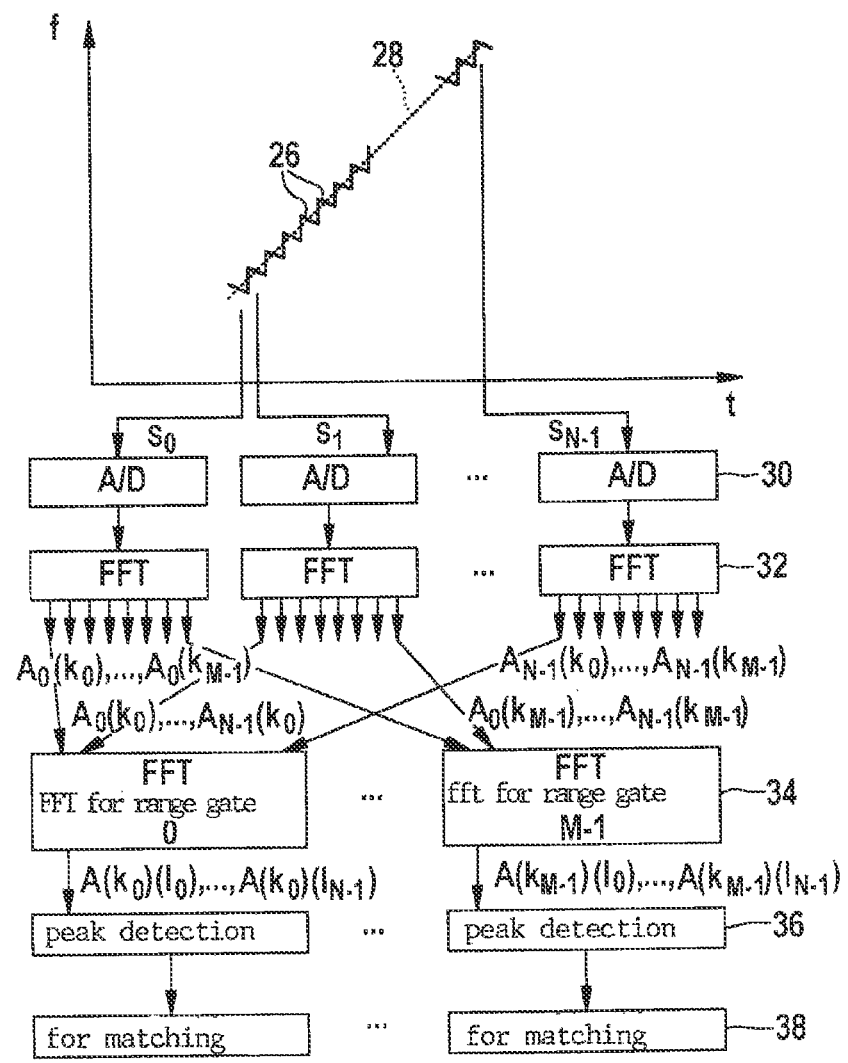
FIG. 3 shows a diagram for explaining the method according to the present invention.

FIG. 3 schematically shows the processing of the baseband signals obtained relative to the respective short ramps 26. The baseband partial signal of each short ramp 26 is scanned using a small number $N_{fast}$ of scanning points by A/D converter 22 (30). A complex-valued frequency spectrum $(A_n(k_0), \ldots, A_n(k_{M-1}))$ is determined in each short ramp 26 with the respective ramp index n, n=0, ..., N−1, with the aid of a first Fourier transformation 32 in the form of a rapid Fourier transformation (FFT). The number of scanning points is, for example, $M=N_{fast}=16$. The number of short ramps 26 of one sequence is, for example, $N=N_{slow}=512$.

A short deviation $F_{fast}$ of short ramps 26 results in a relatively minimal distance resolution $R=c/(2F_{fast})$. For example, a frequency deviation $F_{fast}=5$ MHz results in a distance resolution of R=30 m. Thus, the frequency position of a peak in the frequency spectrum of first FFT 32 provides no precise information about the distance d of an object, but rather merely indicates a parameter range for possible values of distance d and relative velocity v of an object, this parameter range for a respective relative velocity v being limited to a distance range, which has at least the width corresponding to the aforementioned distance resolution R. This parameter range corresponds therefore to a subarea in the form of a band in the distance-velocity space, also referred to hereinafter as d-v-space.

The steeper the short ramps 26 are, the more dominant is the distance-dependent portion $f_d$ of the located frequency. The frequency position in first FFT 32, i.e., the frequency position in the partial signal frequency spectrum, corresponds to a band in the d-v-space limited to at least one distance range of width R. With increasing slope of short ramps 26, the shape of the band within the uniqueness range of the measurement approaches a square of width R in the distance direction.

The partial signal frequency spectra of first Fourier transformation 30 are combined for the respective bands and subjected to a second Fourier transformation 34 in the form of an FFT. The combination is also referred to as the formation of range gates. For example, first FFT 32 in each case provides a frequency spectrum via a number M of frequency bins or range gates m=0.1, ..., M−1. For every short ramp 26 of a higher-order ramp 28, a higher-order frequency spectrum $(A)k_m)(l_0), \ldots, A(k_m)(l_{N-1}))$ is then calculated for a respective range gate m by FFT 34 of the curve over time of the complex values $(A_0 (k_m), \ldots, A_{N-1} (k_m))$ of the frequency bin m over the sequence of short ramps 26.

In a conventional calculation of a frequency spectrum of a baseband signal in a conventional frequency ramp, a Fourier transformation is carried out, for example, in order to subsequently detect frequency peaks, each of which corresponds to a straight line in the d-v-space. Here, in the case of second FFT 34 on the other hand, only those detected objects are taken into account, the distance d and relative velocity v of which correspond to the respective range gate m, i.e., which are situated in a respective band of the distance/velocity space, and thus correspond approximately to a respective distance range.

Thus, a peak in a frequency bin I in higher-order frequency spectrum $(A(k_m)(l_0), \ldots, A(k_m)(l_{N-1}))$ of a second FFT 34 of a range gate m corresponds to a received signal of an object, which has a frequency position in first FFTs 32 at frequency bin m and is situated on the corresponding band in the distance/velocity space and simultaneously meets the conditions of the FMCW equation for higher-order ramp 26. This means that frequency $f_2$ arising over the sequence of short ramps 26 determined in second FFT 34 is composed of a distance-dependent portion $f_{2d}$ and a velocity-dependent portion $f_{2v}$, in which:

$$f_{2d}=2dF_{slow}/(cT_{slow}), \text{ and} \quad (3)$$

$$f_{2v}=2f_0 v/c \quad (4)$$

applies.

Accordingly, the FMCW equation for higher-order ramp 28 describes the straight line d(v) in the d-v-space:

$$d=T_{slow}/F_{slow}(f_2 c/2-f_0 v) \quad (5)$$

The series connection of first and second FFTs 32, 34 corresponds to a two-dimensional Fourier transformation. After peak detection 36 of the frequencies of the peaks in the frequency spectra of second FFT 34, the information about distances and relative velocities of located objects obtained is fed to the frequency matching in a step 38. In addition to the information obtained from second FFTs 34, which corresponds to respective straight lines in the d-v-space, the frequency matching also uses the information about the associated bands of the d-v-space obtained based on first FFTs 32.

This implementation of the frequency matching based on the information obtained in the range gates is explained below with reference to one measuring cycle including four different ramp sets, each ramp set having the structure of a sequence of shorter ramps 26 explained with reference to FIG. 2. Higher-order ramps 28 of the ramp sets of one measuring cycle may differ in their ramp slope and/or in their middle frequency.

In the example described, higher-order ramps 28 formed by the respective ramp sets differ in terms of the ramp slope, so that straight lines with a different slope result for each located object in the d-v-space.

Figure 4:
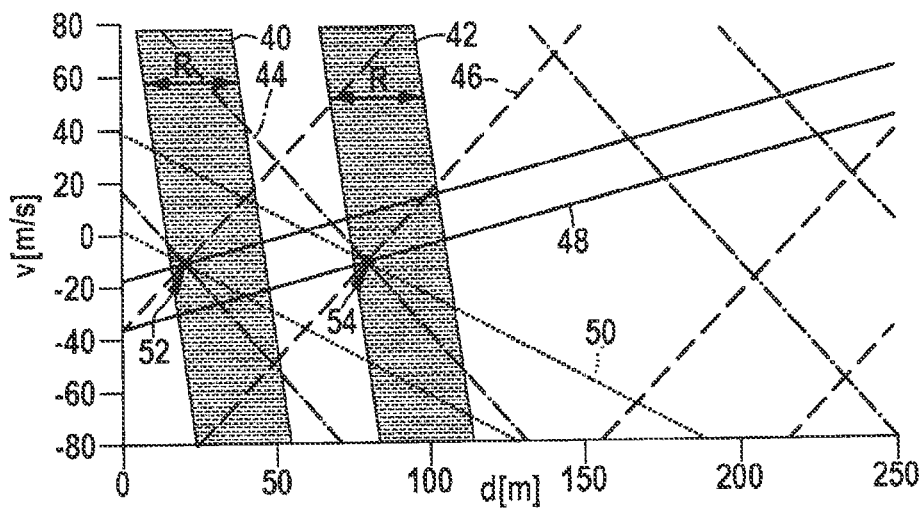
FIG. 4 shows a schematic depiction of straight lines and distance ranges in a distance/velocity space.

FIG. 4 schematically illustrates the association of the located peak frequencies with detected objects based on a depiction in the distance/velocity space. In the example, one measuring cycle includes multiple, in particular, four ramp sets.

For at least one sequence of frequency ramps 26 of one measuring cycle, frequency ramps 26 may have one ramp slope, the absolute value of which is greater than an absolute value of a slope of associated higher-order ramp 28.

Frequency ramps 26 of at least one sequence of frequency ramps 26 of one measuring cycle may have a frequency deviation $F_{fast}$, the absolute value of which is smaller than or equal to the absolute value of frequency deviation $F_{slow}$ of associated higher-order ramps 28, which may be particularly smaller than or equal to $1/10$ of the absolute value of frequency deviation $F_{slow}$ of associated higher-order ramps 28.

In the example in FIG. 4, short ramps 26 of the four ramp sets differ merely by the middle frequencies determined in each case by the curve of higher-order ramps 28. The parameters of short ramps 26 are: $F_{fast}=5$ MHz, $T_{fast}=0.008$ ms, $T_{r2r}=0.008$ ms, and the baseband signals corresponding to the short ramps are scanned at $N_{fast}=8$ scanning points. This has the advantage that the bands of the d-v-space resulting in each ramp set, which correspond to the different frequency positions in the first FFT, are approximately the same for the ramp sets. In particular, they have the same width R in the distance direction and the same offset in the distance direction from the origin d=0, v=0.

The parameters of the higher-order ramps 28 of the ramp sets differ solely by their frequency deviation $F_{slow}$. For the four ramp sets, this is: $F_{slow}=(425$ MHz, $-400$ MHz, $-100$ MHz, $200$ MHz). The middle frequency of higher-order ramps 28, in each ramps set, for example, is $f_0=76.5$ GHz. The ramp duration of higher-order ramps 28 is $T_{slow}=4.096$ ms, identical, for example, for the four ramp sets, and the ramp sets each include a sequence of $N_{slow}=512$ short ramps 26.

In particular, the slope of short ramps 26 of one ramp set differs from the slope of associated higher-order ramps 28. In particular, the absolute value of the slope of short ramps 26 is greater than all absolute values of the slopes of higher-order ramps 28 of the measuring cycle.

In the example depicted, it is assumed that a first target is located at a distance of d=20 at a relative velocity v=−10 m/s and a second object is located at a distance d=80 m and a relative velocity, which is also v=−10 m/s.

In the diagram of FIG. 4, a depiction of the d-v-space having the relative velocity v over the distance d, the position of bands 40, 42 associated with the two objects is identified by hatched areas in the d-v-space. The frequencies according to the corresponding linear correlation between velocity v and distance d obtained from the respective second FFT 34 are depicted as straight lines 44, 46, 48, 50.

During matching, locations in the d-v-space are sought, in which straight lines 44, 46, 48, 50 from the four ramp sets within the scope of a tolerance range associated with the obtained frequencies intersect at a location (v, d) 52 and 54. The frequency matching is simplified considerably by carrying it out separately for the areas depicted with respect to the different frequency positions of the first FFT and, thus, for the depicted areas 40, 42 of the d-v-space. In this case, for a given range gate, i.e., for a given band 40, 42 or frequency position in the first FFT, a matching is carried out in each case between straight lines and corresponding frequencies of the second FFT, which are located at the frequency position of the first FFT corresponding to the band. Thus, the two objects assumed in the example may be reliably detected.

In the depiction in FIG. 4, the straight lines 44, 46, 48, 50 are repeated within the depicted distance range due to the limited uniqueness range of the distance for higher-order ramps 28. As a result of the bands 40, 42 associated with the straight lines, an evaluation of the respective straight lines is possible limited to the respectively associated band, so that the aforementioned ambiguities may be resolved.

Figure 5:
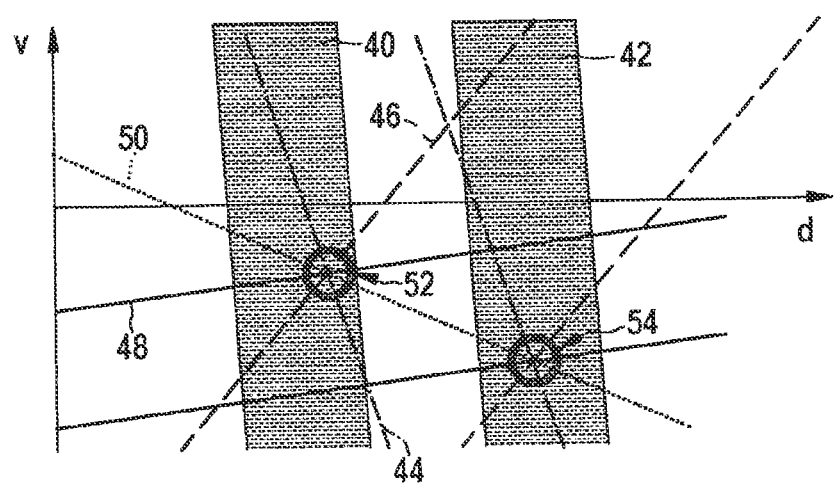
FIG. 5 shows another example of a constellation of straight lines and distance ranges in a distance/velocity space.

FIG. 5 schematically shows another example of a d-v-space for a case in which two objects in a ramp set lie on the same straight line 50 in the d-v-space. The different associated bands 40, 42 allow an association with both objects. Shared straight line 50 obtained for both objects corresponds to a frequency, which in second FFT 34 is located in two different range gates. Accordingly, this frequency occurs at two different frequency positions of first FFTs 32, corresponding to depicted bands 40, 42.

The evaluation of the located frequencies may be limited to the relevant bands of the d-v-space, depending on the traffic situation. For example, relevant bands may be selected based on one driving parameter such as, for example, the driving speed of the host motor vehicle. Thus, at slow driving speed below a speed limit, for example, the selection may be limited to bands, which include distances d below a distance limit. Thus, for example, when the vehicle is stopped, objects far away are not relevant for locating and may be disregarded by appropriately selecting bands to be evaluated. A selected gear of a transmission may also be considered to be a driving parameter.

What is claimed is:

1. A method for determining information about distances and relative velocities of located objects using an FMCW radar, the method comprising:
    modulating a frequency of a transmission signal as sequences of frequency ramps, center points of the frequency ramps within a respective sequence lying on a higher-order ramp;
    down-mixing the received signals in the frequency ramps of one sequence to baseband partial signals, each frequency ramp of the sequence being chronologically associated with a partial signal;
    determining, for at least one frequency position in frequency spectra of the baseband partial signals, a higher-order frequency spectrum over the chronological sequence of amplitudes at the frequency position in the frequency spectra of the sequence of baseband partial signals;
    representing peaks in the at least one higher-order spectrum by straight lines in a distance/velocity space, a respective slope of which is a function of the slope of the higher-order ramp;
    representing different frequency positions in the frequency spectra of the partial signals, in which peaks occur in a higher-order spectrum, by different bands of the distance/velocity space limited to at least one distance range; and
    considering, for the purpose of associating peaks represented by straight lines in the distance/velocity space in the higher-order spectra with objects, the respective bands of the distance/velocity space representing the frequency positions in the frequency spectra of the baseband partial signals, which bands are associated with the peaks as a result of the frequency positions of the peaks in the frequency spectra of the partial signals.

2. The method of claim 1, wherein, for associating peaks in the higher-order spectra represented by straight lines in the distance/velocity space with objects for possible values of distance and velocity, which correspond to a band associated with frequency position in the partial signal frequency spectra belonging to a peak, only those peaks located in the higher-order spectra are considered, which are associated with this band as a result of their associated frequency position in the partial signal frequency spectra.

3. The method of claim 1, wherein the association of peaks occurring in the higher order spectra with objects is carried out separately for different bands associated with respective frequency positions of the partial signal frequency spectra.

4. The method of claim 1, wherein a selection of at least one relevant band is made based on at least one driving parameter, which is associated with at least one possible frequency position in the partial signal frequency spectra, and the association of the peaks occurring in higher-order spectra with objects takes place solely for peaks to which a band pertaining to the selection is associated due to its associated frequency positions in the partial signal frequency spectra.

5. The method of claim 1, wherein, within one measuring cycle, the frequency of the transmission signal is modulated in the form of different sequences of frequency ramps, the center points of the frequency ramps within a respective sequence lying on a higher-order ramp, the measuring cycle including at least two higher-order ramps, which have a different ramp slope.

6. The method of claim 5, wherein the frequency ramps of the different sequences have the same ramp slope within the measuring cycle.

7. The method of claim 1, wherein, for at least one sequence of the frequency ramps of one measuring cycle, the frequency ramps have a ramp slope, the absolute value of which is greater than an absolute value of a slope of the associated higher-order ramp.

8. The method of claim 1, wherein the frequency ramps of at least one sequence of frequency ramps of one measuring cycle have a frequency deviation, the absolute value of which is smaller than or equal to the absolute value of the frequency deviation of the associated higher-order ramps.

9. The method of claim 1, wherein the respective frequency position in the frequency spectra of the baseband signals is determined with a resolution, which corresponds to a distance resolution corresponding to a distance of at least 10 m.

10. An FMCW radar sensor, comprising:
    a control and evaluation unit configured for determining information about distances and relative velocities of located objects using an FMCW radar, by performing the following:
        modulating a frequency of a transmission signal as sequences of frequency ramps, center points of the frequency ramps within a respective sequence lying on a higher-order ramp;
        down-mixing the received signals in the frequency ramps of one sequence to baseband partial signals, each frequency ramp of the sequence being chronologically associated with a partial signal;
        determining, for at least one frequency position in frequency spectra of the baseband partial signals, a higher-order frequency spectrum over the chronological sequence of amplitudes at the frequency position in the frequency spectra of the sequence of baseband partial signals;

representing peaks in the at least one higher-order spectrum by straight lines in a distance/velocity space, a respective slope of which is a function of the slope of the higher-order ramp;

representing different frequency positions in the frequency spectra of the partial signals, in which peaks occur in a higher-order spectrum, by different bands of the distance/velocity space limited to at least one distance range; and considering, for the purpose of associating peaks represented by straight lines in the distance/velocity space in the higher-order spectra with objects, the respective bands of the distance/velocity space representing the frequency positions in the frequency spectra of the baseband partial signals, which bands are associated with the peaks as a result of the frequency positions of the peaks in the frequency spectra of the partial signals.

* * * * *